US005124730A

United States Patent [19]

Lewicki, Jr. et al.

[11] Patent Number: 5,124,730

[45] Date of Patent: Jun. 23, 1992

[54] PRINTING SYSTEM

[75] Inventors: Walter J. Lewicki, Jr., Lancaster, Pa.; John H. Bowers, Clarksburg, N.J.

[73] Assignee: Armstrong World Industries, Inc., Lancaster, Pa.

[21] Appl. No.: 625,299

[22] Filed: Dec. 10, 1990

Related U.S. Application Data

[63] Continuation-in-part of Ser. No. 510,081, Apr. 17, 1990, and a continuation-in-part of Ser. No. 510,130, Apr. 17, 1990.

[51] Int. Cl.[5] .................... G01D 15/06; G03G 15/01; G03G 13/14

[52] U.S. Cl. .................... 346/153.1; 346/11; 346/157; 430/126

[58] Field of Search .................... 346/153.1, 157; 430/126; 355/326

[56] References Cited

U.S. PATENT DOCUMENTS

| | | | |
|---|---|---|---|
| 4,286,031 | 8/1981 | Kuehnle et al. | 430/126 X |
| 4,389,116 | 6/1983 | Vogel | 355/85 |
| 4,504,837 | 3/1985 | Toyoda et al. | 346/1.1 |
| 4,521,097 | 6/1985 | Kuehnle et al. | 430/126 X |
| 4,754,294 | 6/1988 | Kato | 346/160 |
| 4,827,315 | 5/1989 | Wolfberg et al. | 346/160 |

*Primary Examiner*—George H. Miller, Jr.
*Attorney, Agent, or Firm*—James J. Ralabate

[57] ABSTRACT

This invention involves both a process and apparatus for printing an image on a removable thicker dielectric layer than conventionally used in other systems. The dielectric layer is at least 0.2 mils thick and is removed from the system after it is imaged, developed and fixed. The toner used preferably incorporates a resin of the same family resin as used in the dielectric layer or layers. The imaged layer may be attached to a base such as a tile or wallpaper support structure. The base support substantially strengthens the dielectric layer which is important for shipping, storage, ultimate use and durability.

28 Claims, 5 Drawing Sheets

1
2
3
4
5
6
7
8
9
10
11
12
16
17
18
19
20

36
37
38
39
40
2
41
42
42
37
1

30
43

37
1
47
47
1
48
2
2
1
49
50
1
51

37

PRINTING SYSTEM

This application is a continuation-in-part application of U.S. patent application Ser. No. 07/510,081 and Ser. No. 07/510,130 both filed Apr. 17, 1990.

This invention relates to a novel printing system and, more particularly, to a system and apparatus utilizing ion projection technology. This application is a continuation in part application of U.S. patent application Ser. Nos. 07/510,081 and 07/510,130 both filed Apr. 17, 1990.

BACKGROUND OF THE INVENTION

In copending parent application Ser. Nos. 07/510,081 and 07/510,130 novel printing systems and apparatuses are disclosed and claimed wherein the image fixed dielectric layers are laminated or overcoated with a visually clear material. This overcoating provides structural stability to the imaged dielectric layer and also encapsulates the toned image to permanently fix it in place. Another feature of the laminate is that it prevents shrinkage of the dielectric layer and provides increased protection to the layer and image at the separation station. In Ser. No. 07/510,081 the invention involved both a process and apparatus for printing an image on a removable thicker dielectric layer than conventionally used in other systems. The dielectric layer used is at least 0.2 mils thick and is removed from the system after it is imaged, developed, fixed and laminated or overcoated with a layer of the same family resin as used in the dielectric layer or layers. The imaged and overcoated layer may be later attached to a substrate such as a tile or wallpaper base. As noted earlier, this overcoating substantially strengthens the dielectric layer in addition to overcoating the image. In Ser. No. 07/510,130 the invention involved a non-impact printer and process having two or more image-toning stations on a conductive drum. By the use of multiple stations having separate imaging and toning means, complicated image registration structures were avoided. The dielectric layer is advanced through image forming means that are selectively developed and fixed at separate stations. The final colored image is then overcoated and the containing dielectric layer removed from the drum. Both parent applications stressed the need for an overcoating or laminated upper layer.

It has now been found that the overlamination or overcoating step is not essential in the system because it can be done in a post system step. Also, by controlling the formulation of the coating, and by using more rigid dielectric films the shrinkage problem present in the parent applications' materials is no longer a concern. In addition, controlling the processing conditions of the printing system, shrinkage as well as image size can be effectively controlled. Also, choosing a conductive belt which is dimensionally stable but which will preferentially adhere the dielectric film and release it on command significantly improves the original printing systems.

More rigid dielectric films and/or formulations which result in the desired dielectric film after drying or curing can be provided. This can be accomplished in one or through a combination of the following ways: by substantially reducing the plasticizer used in the formulation, selecting resins which have a higher Tg, adding fillers, polymerizing in-situ, etc. Those skilled in the art can effectively formulate or choose any number of materials which will result in film dielectrics useable in this invention.

Therefore, in place of overlamination, structural image and layer stability can be provided by: use of a more rigid dielectric film or coating formulation and/or by using toners comprising polymers that will have substantially increased bonding characteristics and which will adhere to the film through normal fixing means, controlling the heating and cooling of the conductive belt during printing, and choosing a dimensionally stable belt. As noted earlier however, if lamination is desired, it can be accomplished in an after or post system step.

There are also known and used today various marking systems which use electrographic technology. Generally, these systems use a pattern of electric charges which coresponds to a desired image; this is known as a latent electrostatic image or charge. This charge is generally deposited upon a dielectric surface of a drum or belt. This surface bearing the latent electrostatic image is moved through a toner station where a toning material of opposite charge adheres to the charged areas of the dielectric surface to form a visible image. The drum or belt is advanced forward and the toned image is either transferred to a receiving media or fused directly on the charged surface. After the fusing operation in the transfer system, the dielectric can be treated in various ways to clean its surface of residual charge or toner or both. This cleaning can be performed by any known electrostatic and/or mechanical cleaning method.

In electrographic imaging and printing processes both photoconductive insulators and dielectrics have been used, however they are quite different from each other. Photoconductive insulators will only hold an electrical charge in the dark which makes them useful in limited applications such as copiers and the like. Dielectrics, on the other hand, can hold an electrical charge in the presence of visible light which makes them much more practical for use in commercial manufacturing processes such as the present invention.

There are also known many electrostatic printing systems such as those described in U.S. Pat. Nos. 3,023,731 (Schwertz); 3,701,996 (Perley); 4,155,093 (Fotland); 4,267,556 (Fotland); 4,494,129 (Gretchev); 4,518,468 (Fotland); 4,675,703 (Fotland); and 4,821,066 (Foote). All of these systems disclose non-impact printing systems using electrostatic images that can be made visible as one or multiple toning stations. In those systems ions are projected from an ion-generating means onto the surface of a dielectric layer by a print head such as described by Fotland in U.S. Pat. No. 4,155,093 or in U.S. Pat. No. 4,267,556. Generally, the print head comprises a structure of two electrodes separated by a solid dielectric member, a solid dielectric member and a third electrode for the extraction of ions. The first electrode is a driver electrode and the second is a control electrode; both are in contact with the separating dielectric layer. There is an air space at a junction of the control electrode and the solid dielectric member. A high voltage high frequency discharge is initiated between the two electrodes creating a pool of negative and positive ions in the air space adjoining the control electrode. The ions are extracted through a hole in the third electrode by an electrostatic field formed between the second and third electrodes. In Fotland U.S. Pat. No. 4,267,556 the image-forming ion generator takes the form of a multiplexed matrix of finger electrodes and selector bars separated by a solid dielectric member.

Ions are generated at apertures in the finger electrodes at matrix crossover points and extracted to form an image on a receiving member. Grey scale control is achieved by pulse width modulation of the second (finger) electrode as described in Weiner U.S. Pat. No. 4,941,313. While prior art ion projection heads are useful in many applications, they are not adapted for use in systems requiring a relatively thick and hence low capacitance dielectric imaging layer. Generally, systems using ion projection printing technology utilize powder toners. In electrography, liquid development systems are best suited to accurate rendition of grey scale images and high resolution development. The components of toner systems can contaminate the electrodes in prior art ion projection heads and can render them substantially non-functional. When liquid toners are used, contamination of the ion projection cartridge is more of a problem than it is when using traditional dry powder toners. This is because the toner particles are considerably smaller in liquid toners than in dry powder toners (e.g. 1 micrometer vs 25 micrometers) and also because there is a liquid component which evaporates. Thus, there is a high likelihood that the residual toner and/or solvents will migrate to the ion projection cartridge causing a loss of ion emission efficiency or total loss of emission. Incorporation of an air knife prior to the ion projection head can reduce the exposure of the head to contamination. The air knife will prevent exposure of the ion projection head to the toner particles and solvents in liquid toners by purging the space around the ion projection head with solvent free air or other gas. In addition, prior art projection heads are not particularly desirable for grey scale printing. Improved and novel ion projection heads would be required to provide improved results in systems using liquid development systems and for those striving for acceptable grey scale density. Prior art ion projection heads are not only not particularly desirable for grey scale printing, but have substantial limits concerning the number of grey scales that can be achieved. For example, most can manage only to achieve 4 grey scales.

In addition to the deficiencies in prior art print heads, the known ion projection printing systems are not specifically designed to accommodate multicolored printing systems at rapid speeds. Therefore, while ion-generating systems utilize inherently sound technology, there are several major improvements that need to be found before these systems can be used to produce multicolored final products of high print quality and at rapid speeds.

SUMMARY OF THE INVENTION

It is therefore an object of this invention to provide an ion generation non-impact printing system devoid of the above-noted disadvantages.

Another object of this invention is to provide a printing system using a conductive substrate upon which a dielectric layer is imaged, said system capable of providing continuous tone, magazine quality images.

A still further object of this invention is to provide a non-impact printing system that can be used in the manufacture of relatively thicker final products.

Still another object of this invention is to provide an electrographic printing system that is particularly suitable for high speed color systems.

Yet another object of this invention is to provide an electrographic printing system that is particularly suitable for high speed color systems utilizing liquid toners.

Yet another object of this invention is to provide an electrographic printing system wherein substantially thicker lower capacitance dielectric layers may be used and capable of providing accurate renditions of grey scale images.

Another yet further object of this invention is to provide a novel electrographic printing system suitable for both direct and transfer imaging.

Another still further object of this invention is to provide a non-impact printing system capable of producing continuous tone, magazine quality prints at rapid speeds.

Still yet another object of this invention is to provide a novel system and apparatus for manufacturing products bearing colored images of improved quality, density and resolution.

The foregoing objects and others are accomplished according to this invention by providing a printing system capable of using organic dielectric layers up to about 10 or more mils thick. In the present system these thicker dielectric layers are electrostatically imaged by the use of a novel print head. After the novel print head deposits the latent image on the surface of the dielectric, a novel liquid toner comprising substantially the same resin as in the dielectric is used to form a visible image. While the process of the present invention can be used for monochromatic printing it is particularly suitable for use in a multicolor system. Also the present novel system is capable of substantial improvement in grey scale rendition. For example, it can provide up to 128 levels on the grey scale. In a multicolor system the imaged dielectric imaging layer progressively passes through a series of development stations each containing the appropriate colored toner. These development stations can be progressively situated around a conductive substrate, for example, a drum or an endless belt. The dielectric material is deposited on the conductive substrate. The term "conductive substrate" used throughout this disclosure includes drums, belts, endless belts or combinations thereof. In some instances a belt and drum may be used in the same system. Each toner is responsive to selective latent images corresponding to the multicolored image in the desired final color balance. Registration of the resulting color images may be achieved by any known registration means such as that disclosed in U.S. Pat. No. 4,821,066. The accuracy of the registration can be controlled by the proper sensing mechanism. In addition, it is important to the present invention that the appropriate toner particle be used, i.e. one which will respond to pressure, solvent, spray, heat or other appropriate fixing without any substantial deformation of the toner particle or reduction of the diameter of the toner particle. An important aspect of this invention is that the toner or toning material contain the same resin as the resin used in the dielectric layer. By the "same" is meant either the identical resin or a resin from the same family such as polyvinylchloride and copolymers of vinylchloride with minor portions of vinyl acetate or other materials, etc.

The terms "dielectric" or "dielectric layer" used throughout the disclosure and claims is intended to include films, powder, liquid formulations, papers coated and uncoated, mixtures thereof or any other suitable form of a dielectric useful in the present invention. Extreme care must be taken to avoid defects in the dielectric layer. Defects such as pinholes in the dielectric layer can cause complete breakdown of the system because of charge leakage, charge bleeding or other electrical imperfections associated with the integrity of the latent image. Some dielectrics that can be deposited on either or both the drum or belt and useful in the present system include organic resins such as acrylics like polymethyl methacrylate, vinyl-based polymeric materials, and other suitable organic resins including polyimides listed later in this disclosure. Also, the imaging characteristics of the dielectric used must not be affected by any excessive elevated temperatures used in the printing process or by high humidities. In addition, the dielectric must have substantial dielectric strength, high charge acceptance and relatively low charge leakage rates. These are influenced by relative humidity (because of moisture absorbance of some materials) and temperature because some dielectric materials lose their dielectric properties at elevated temperatures. Imaging should take place below the Tg of the dielectric. As noted earlier, it must be substantially free of any pinholes and must have the proper built in adhesive characteristics in order to bond to toners, other layers or other bases. Dielectrics for use in this invention including those noted above must offer all of the above dielectric and physical properties. Other known thick non-organic dielectric materials such as aluminium oxide, glass enamels and the like should be carefully avoided because of their tendency to crack under stress thereby creating cracks and surface defects. Also, because of their relative affinity to water, they could cause another electrical leakage path and supply the ions that cause dielectric absorption. If found to be suitable however, some inorganic materials can be combined with the organic dielectrics of this invention. The resistivity of the dielectric layer of the present invention should be at least $10^{12}$ ohm-centimeters. A multilayered structure may be used to create the said dielectric layer in order to achieve the desired characteristics stated above. As noted earlier, it is also important that the dielectric layer whether a monolayer or multilayer have a high charge acceptance and substantial dielectric strength.

The charge image is created on the dielectric layer as above mentioned by a novel print head which is modified specifically to function with the thicker dielectric layers of this invention. Generally, in ionographic systems, the head used creates relatively high voltage high frequency discharges which are initiated between two electrodes. This discharge creates a pool of negative and positive ions in the air space adjoining the finger electrode. The negative ions are accelerated by a positive field resulting in a deposition of a charge on the surface of the dielectric layer thereby forming the latent image. As earlier explained, existing printer heads are not usable in the present invention because the number of ions deposited per RF cycle is too great. A novel print head is required to provide the necessary charge and image characteristics required in the system of this invention. Generally, this novel print head differs from typical prior art print heads (such as that disclosed in U.S. Pat. No. 4,160,257) in the following ways: (1) it has greater spacing between the finger and screen electrodes, (2) addition of an additional screen electrode beyond the first, (3) change the diameter of the hole in the finger electrode and (4) any combination of the above.

The air knives may incorporate additional apertures near the ion projection head to introduce an inert gas, preferably nitrogen, in the vicinity of the ion projection head to prevent exothermic chemical reactions that may take place during ionization, thereby substantially reducing the operating temperature of the ion projection head.

Liquid toner is highly preferred in the present system over dry toner because of the grey scale capability, increased density, density control and resolution attainable. The following considerations are important in selecting the toner of this invention: (1) color stability when exposed to ultra-violet light, (2) color stability when bound in a system with plasticizer and exposed to elevated temperatures, (3) color gamut achievable with the toners, (4) ability to obtain the maximum optical density desired, i.e. (1.7) and (5) ability to obtain the desired optical density over the range of charge used in the invention (q/m ratio). In addition, selecting the resins of the liquid toner are important for reasons of adhesion. In particular, when an average adhesion of the decorated image is required only to one dielectric surface, then conventional families of resins can be used in the toner which are similar to the dielectric. For those cases in which greater adhesion is required such as when high optical densities are required and it is desired to adhere toners between two films then a novel toner using other adhesion promoters can be used. These promoters can be either pre-applied to the films or can be incorporated in the toner itself. The adhesion promoters can be a solid wetting agent which promotes bonding between non-compatible materials. It also promotes bonding when used in toners with high pigment to binder ratios.

In the present system, the toned image can be fixed by conventional means such as heat, solvent, pressure, spray fixing or other appropriate fixing means. Typical fixing means are defined in U.S. Pat. Nos. 4,267,556; 4,518,468 and 4,494,129. Since the dielectric layer is removed from the conductive substrate at the conclusion of the process of this invention, cleaning of residual charge or contamination is not required.

The dielectric may be deposited upon a conductive substrate by any suitable dielectric dispensing means which provide a substantially defect-free exposed surface. As indicated earlier throughout this disclosure, a conductive substrate will be used. In the disclosed examples a conductive drum or endless belt is used. However, it is intended that systems using both a belt and a drum are intended to be included. There are situations where both a drum and belt can advantageously be used in the same apparatus and system. Also, when either drum or belt is used alone, it is intended that the other or any other suitable substrate be included since they are equivalent for purposes of this invention. Also, the term "substrate" is intended to include belts, drums and/or any other means upon which the dielectric layer is deposited, transported and eventually separated and by which an electrical return path to a known potential is provided. In one embodiment of the invention a liquid dielectric formulation is deposited on the upper surface of a conductive drum or continuous belt. In one embodiment of the invention a liquid dielectric formulation is deposited on the upper surface of a conductive drum or continuous belt. There are situations where both a drum and belt can advantageously be used in the same apparatus and system. Also when either "drum" or "belt" is used alone, it is intended that the other be included since they are equivalent for purposes of this invention. Also, the term "substrate" is intended to include belts or drums and the like upon which the dielectric layer is deposited and eventually separated from.

After dielectric deposition by the dielectric dispensing means, the dielectric layer is then passed through means to cure and to remove the liquid or solvent forming thereby a continuous dielectric layer on the belt. Even though resins from solvent solutions, slurries, dispersions and colloids can result in a pinhole-free dielectric film after solvent evaporation, dry resins can be applied to the conductive substrate and fused to form the same type of dielectric film. Also, cureable resins can be applied at substantially higher solids and photopolymerized and/or cross-linked to render or to form the desired dielectric on the conductive substrate as well. This continuous layer must after curing be capable of receiving and holding a latent electrostatic charge. The dielectric layer is preferably about 0.2 to about 1.5 mils thick but can be up to about 10 mils thick if suitable. An endless belt is preferred in some instances over a drum because of space considerations, uniformity of procedure and tolerances, better control of dielectric layer when deposited as a liquid, ease of separation of product and to provide a more energy efficient system.

Another method of providing a dielectric layer on the conductive substrate is by using a preformed dielectric film. This film is usually conveyed to an endless belt from a spool or other dispensing means. It is unwound upon the conductive substrate and heat-laminated to effect a very tight and secure contact with the substrate. Some dielectrics such as rigid PVC film and polyester terphthalate can be applied directly to the conductive belt or drum using only heat and pressure. Alternately, a thin permanent dielectric may be made part of the conductive drum or endless belt and charged to a known potential by any standard means. The preformed dielectric film may be oppositely charged and then applied to the charged dielectric side of the conductive drum or endless belt thereby creating an electrostatic field and hence a force which strongly attracts the preformed dielectric film to the conductive drum or endless belt. The contact must be secure enough to allow the dielectric layer to be advanced and processed through each station but ultimately removable at the separation station. Once the dielectric layer is formed on the conductive belt or drum it is discharged by conventional means to provide an electrically clean, uncontaminated surface able to accept a sharp imagewise ionic charge. In the preferred embodiment, the heat lamination step is sufficient to bond it to the conductive substrate and to discharge the film. In some cases, however, a slight bias voltage is applied to the dielectric film prior to image-charging with the ionographic head to eliminate background color on those areas of the imaged film in which no color is desired. This voltage is minimal and is usually done only for the first color from the toner system. It can be incorporated before each ionographic print head. We have found that the use of a discharge corona which is electronically controlled to apply a positive dc voltage to the dielectric is very helpful to control background color in areas in which we do not want color. Undesirable background color is the result of many factors and controlling this is important in prints which have open field designs and light colorations such as beige. Also, for those situations where heat is not used to secure the film to the conductive substrate, then a discharge corona can be used before the ionographic print cartridge. After the novel print head of this invention is used to deposit the latent image upon the dielectric layer, the endless belt or drum and the imaged dielectric layer pass through a development station where the dielectric is toned by use of a novel liquid toner. This liquid toner contains a resin which is of the same family as used in the dielectric, i.e. of the vinyl, acrylate or polyester families. The resin family chosen is not only a function of its ability to bond to the dielectric film which is being imaged but also the temperature which is used in fixing the toner. In some cases only the temperature required to evaporate the Isopar is necessary for fixing the toned or developed image. Once the image is toned the drum or belt/dielectric composite is passed over a heated platen or through a hot air dryer. This step evaporates the Isopar carrier and adheres or fixes the toner to the dielectric substrate. Other suitable drying and fixing means can be used such as IR heat pressure fixing, spray fixing and combinations hereof. Spray fixing is through the use of solvent spray or mist which co-dissolves the resin encapsulated pigment particles.

Toners comprising both dyes and pigments are used as colorants in this invention. Their choice primarily depends on the end use application. In the case of a 4 color printing system, pigments are used in this invention to give a full color gamut to each of the primary colors and black. In the case of creating a heat transferable image, sublimeable dyes, often dispersion dyes, can be used. Through the proper use of dye and material, decorated images can be made to become part of the dielectric layer or heat-transferred to another material after the lower temperature fixing is completed.

Once the image is fixed to the dielectric, it is cooled and removed from the belt and may be in a subsequent process further attached to a thicker base structure. In the preferred embodiment of the invention, a white or clear dielectric film, e.g., rigid PVC, is laminated to the stainless steel drum or belt, ionographically imaged and toned with liquid toners. The temperature of the toned film and drum or belt is raised to evaporate the Isopar and adhere the toners together and to the dielectric film. After cooling, the imaged film is removed from the drum or belt and rewound.

For applications requiring greater adhesion, an adhesive or adhesives can be preapplied to one or both sides of the dielectric and or to the drum or the belt prior to lamination of the dielectric to the belt, or in any combination thereof. This provides a greater degree of adhesion of the toners to the dielectric and of the imaged dielectric film to other substrates for those products which require a more demanding and permanent type of adhesion.

For example, in the making of a floor tile product, a thin acrylic adhesive is preapplied to a PVC dielectric film for greater adhesion of the toners to the imaged dielectric and to another clear PVC film that is post-laminated to it for on-floor protection of that image. In this case, an adhesive between the conductive belt and the PVC dielectric film is not required to form a permanent bond between the non-imaged side of the PVC film and a limestone filled PVC tile base in post lamination operations.

The final imaged product is comprised of a dielectric layer, preferably a clear or white dielectric about 0.5 to 4 mils thick. This product can be used in the subsequent manufacture of posters, photographic simulations, wall coverings, and floor and ceiling tiles. If it is desired to produce a multi-colored print with an illusion of depth, a layer of thin clear film can be dispensed over a pre-imaged film, the combination of which can be printed using the approach previously described. This process can be repeated for any number of layers and different colors. These thin clear films are approximately 2.5 mils thick but can be any suitable thickness depending upon the desired result. When an illusion of image depth is desired, the first dielectric layer is preferably white reflective and the subsequent dielectric layers are colorless. All of the dielectric layers can however be colorless if this enhances the desired results. The term "dielectric layer" throughout this disclosure and the claims is intended to include one or multiple layers of a dielectric material. There are several versions of the present process especially those involving subsequent or post system treatments. For example, in a post treatment procedure, any substrate such as those used in wallpaper bases, tile base structures or any other decorative item may be combined with the imaged dielectric layer.

The following procedure is typical of the system disclosed in parent applications Ser. Nos. 07/510,081 and 07/510,130 using a lamination overcoating step. This step is not required in the present invention.

As an example, a 1.5 mil rigid white polyvinylchloride dielectric film made by the Orchard Corp., St. Louis, Mo. was adhered to the 3 mil thick stainless steel belt using a dielectric vinyl coating made from a formulation consisting of 20% solids of VAGH resin, manufactured by Union Carbide in a methyl isobutyl ketone solvent (MIBK). In this case, before the VAGH coating was completely dried and at a surface temperature at 250° F. on the belt, the 1.5 mil white film was applied. The film contained a 0.2 mil coating of the same YAGH resin which was preapplied to the film using conventional rotogravure printing means. After cooling, it was corona discharged and electrographically imaged using an S3000 ionographic print head manufactured by Delphax Systems, Mississauga, Canada, in combination with a nitrogen environment. The head was spaced approximately 10 mils above the surface of the dielectric coating. The nitrogen formed an inerting and cooling blanket between the bottom screen of the print head and the dielectric coating. Pulse width modulation of the head supplied by a separate electronics package varied between 0.8 and 2.2 microseconds in 16 equally timed increments. The charge was applied to the dielectric coating in the form of a checkerboard pattern having different levels of charge. The dielectric was then toned with a cyan liquid toner (CPA-04) supplied by the Research Labs of Australia, Adelaide, Australia. The toner was at a 4% concentration in ISOPAR G. The developing system used was a three roller type used by the Savin Corp., Stamford, Conn. in the 7450 photocopier and adapted for this process. After evaporation of the ISOPAR, the toned image was fixed in a steel over rubber roller fixing nip at a surface temperature of 200° F. The fixing roller was at 125° F. to prevent the toner from lifting from the dielectric surface as it passed through the nip. The toned image was then passed to an adhesive coating operation where VAGH resin is applied from a 20% solids solution and dried. The resulting structure was then laminated to a 3 mil thick rigid clear polyvinylchloride film using heat and pressure in a laminator. This over-laminated structure was conveyed and cooled to separate from the belt. The resulting film showed distinct blocks of cyan color positioned upon the dielectric film and had different optical densities and demonstrated the attainment of 16 levels of grey.

The resulting structure was removed from the belt at ambient temperatures and adhered to a 60 mil thick tile to form a floor tile structure.

EXAMPLES AND PREFERRED EMBODIMENTS

The following are examples of the specific non-impact printing process of the present invention not requiring a separate lamination step.

EXAMPLE #1

A 1.5 mil rigid white dielectric PVC film made by the Orchard Corporation was precoated with an 18.5% solids coating of VAGH resin from a suitable solvent solution. The coating was applied at the rate of 0.3–0.4 grams/sq. ft. using a blade coater. The surface of the dried coating was continuous, pinhole-free and smooth. The coated film was dispensed from an unwind stand and adhered to a stainless steel belt using heat and pressure in combination with a heated three-roll nip. After bonding the film to the belt, the film measured 90–100 degrees Centigrade. The adhered film plus belt were conveyed beneath an ac discharge corona to neutralize the surface of the dielectric film. An S3000 ionographic print head manufactured by Delphax Systems, Mississauga, Ontario, Canada in combination with a nitrogen environment was used to apply charge to the dielectric film. The head was spaced 10 mils above the surface of the dielectric film. The nitrogen formed an inerting and cooling system for the print head and the dielectric film.

Pulse width modulation of the head supplied by a separate electronics package varied between 0.8 and 2.2 microseconds in 16 equally timed increments. The charge was applied to the dielectric coating in the form of a checkerboard pattern having different levels of charge. The dielectric was then toned with a cyan liquid toner (Series 100) supplied by Hilord Chemical Corporation, Hauppauge, N.Y. The toner was at a 4% concentration in ISOPAR G. The developing system used was a three roller type used by the Savin Corporation, Stamford, Conn. in the 7450 photocopier, and adapted for this process. The ISOPAR G was evaporated from toned surface and the temperature of the film, while it was still adhered to the belt, was increased to set the toners to the VAGH coating. After heating to a temperature of about 70–100 degrees C., it was cooled to ambient conditions and removed easily from the stainless steel belt. The combination of: the use of a precoated rigid white PVC film, heating the toned image plus film to a temperature which adheres the toners to the adhesive-coated dielectric film and at which temperature the film is well anchored to the belt thus maintaining the film's stability during heat fixing, and cooling the toned film sufficiently to separate it from the belt allows this improvement to occur resulting in a roll or sheet of imaged and toned dielectric requiring no overlamination step to prevent shrinkage.

In a post-printing system operation, to give better rub-resistance to the toned image, the toner was given a thin protective overlayer by spraying the same resin from a more dilute solution (16.7%) of the same VAGH resin. A solvent blend of MIBK and MEK was used in the spraying mixture. The spray-coated image was then air dried. After drying, the image could not be rubbed from the surface of the dielectric film. The resulting film showed distinct blocks of cyan color sandwiched between the two VAGH coatings on the dielectric film having different optical densities and demonstrated the attainment of 16 levels of grey. Also, the electrographically imaged structure can be further processed by adhering the unimaged side of the dielectric to a 10 mil thick vinyl coated board using conventional laminating equipment which is available in the industry.

EXAMPLE #2

The imaged dielectric from Example #1 was further processed into a floor tile material by using conventional post-bonding techniques. Starting with the imaged dielectric of Example #1 which has been cooled, separate from the belt and rewound on a roll; this material was heat bonded onto an 80 mil thick tile base consisting of limestone, fillers and vinyl: stabilizers, binders and plasticizers. Those skilled in the art can use either roll or flat bed bonding techniques. In addition, during the same post-printing base bonding operation, a clear protective overlayer was bonded to the imaged surface of the dielectric. This layer consisted of a 3 mil clear rigid PVC film supplied by Klockner Pentaplast of America, Gordonville, Va.

In a separate coating operation, one side of this clear film was pre-coated with a VAGH resin from a 20% solids ketone solution at the rate of 0.3–0.4 grams/sq. ft. dry. The VAGH-coated side of the 3 mil clear film was brought into contact with the toned image of the dielectric during overlayering. Bonding conditions in the heated press were: 320 degrees F., 20 seconds and 80 psi.

After cooling to ambient conditions in the press, the resulting structure had a permanent bond between all layers including the electrographic image and the surface of the image is well protected from foot traffic by the 3 mil clear rigid vinyl wear layer. In addition, this structure was embossed using again conventional embossing techniques to incorporate three-dimensionality to the surface of the tile thus further enhancing the visual aesthetics of the decorated surface product.

EXAMPLE #3

The same white rigid PVC dielectric film of Example #1, but at a thickness of 2.7 mils was bonded to the stainless steel belt. However, in this case, the VAGH coating of Example #1 was not applied to the white film as a separate step prior to bringing the film to the printing system. The same ionographic head configuration and process that was used in Example #1 was used in this example to image the charged dielectric. In this case, the charged dielectric was toned using cyan toner 48T supplied by Hilord Chemical Corporation at 1% concentration. This toner has an adhesion promoter built into the formulation and the adhesive precoat on the dielectric film was not required. During ISOPAR evaporation, while the film was still adhered to the belt, the surface temperature within the drying section measured about 100° C. After cooling to ambient conditions, the film was removed from the belt without any stretching or appreciable size change. The resulting film demonstrated the attainment of multiple levels of grey and a toned image which has excellent adhesion to the dielectric. The toned image could not be rubbed from the surface of the dielectric after it was cooled and separated from the belt.

This improved adhesion is due in part to: the use of dielectric materials which contain less plasticizer, the use of newer types of toners, and to various improvements of the printing system. The use of the novel liquid toners which contain the adhesion promoters will bond directly to the dielectric with heat alone. Also, the dielectric film is well adhered to the conductive substrate after toner development and during heat fixing, thus enabling the toned image to be heated without adverse effects of the image during processing. After cooling of the toned image on the belt, the imaged film released easily from the belt without appreciable size change either through shrinkage and/or stretching.

EXAMPLE #4

A white dielectric coating made at 38% solids, comprised of A21 resin supplied by Rohm & Haas, Philadelphia, Pa., and $TiO_2$ pigment, in a ketone solvent solution was applied to a stainless steel belt using a blade coater. After solvent evaporation and oven drying, the dry film had a thickness of 1.5 mils. The Tg (glass transition temperature) of this material was 105 degrees C. and the material is very rigid and stable at room temperature and an excellent dielectric for imaging. In addition, the white dielectric material when heated to the processing temperatures required during printing makes this material ideal for the invention. The material becomes flexible, but it is well adhered to the conductive belt and it remains stable during processing even after cooling and separation from the belt.

The white dielectric film now adhered to the conductive belt was then processed on the printing system using the imaging system described in Example #1 and the toner applied was DPB-1 black toner supplied by Hilord Chemical Corp. After separation from the belt, the film contained black images which demonstrated various shades of grey which could not be rubbed off or smeared. The film was then post-bonded to a 1.5 mil thick rigid PVC film containing UV stabilizers which provided outdoor weatherability. In addition, to provide for a stiffer structure, the back of the white dielectric or its nonimaged surface could be post-bonded again but to a vinyl latex coated posterboard.

EXAMPLE #5

A 1.5 mil white rigid PVC dielectric film made by the Orchard Corp., St. Louis, MO. was precoated with A21 resin supplied by Rohm & Haas, Philadelphia, Pa. It was applied at the rate of 0.3–0.4 grams/sq. ft. from a 20% solids coating from a ketone and acetate solution which was applied to the stainless steel belt using the process of Example #3. After heat bonding the film to the belt, the film measured 90°–100° C. The film and belt were electrically discharged and cooled to 50° C. A charged image was applied to the discharged film using a pulse width modulation system similar to that used in Example #1. The first color applied was yellow toner Y3 supplied by Hilord Chemical Corporation from ISOPAR G at a 1% concentration. Excess ISOPAR was removed from the surface using the roller developing system similar to that of Example #1. 100% charged cancellation was achieved after development of the yellow toner. The remaining ISOPAR was evaporated and heat fixing of the toner to the film was carried out as in Example #3. The fixed toner could not be rubbed from the surface of the white PVC film even after cooling it to ambient conditions.

The second color of a multicolor printing system, magenta, was applied to the same dielectric film containing the fixed yellow toner by passing the still adhered dielectric film underneath the same ionographic print unit, imparting to it a second pulse width modulated charge, and developing it using the same toner development system but with magenta toner. The film was still held sufficiently to the belt at room temperature but its adhesion may be enhanced with the use of some heat prior to imaging if found to be necessary. In this case, no heat was used and the film did not delaminate from the belt during the steps of: imaging, toner application and development of the magenta image. A 50/50 blend of magenta M10 and M12 supplied by Hilord Chemical Corporation at a 1% concentration in ISOPAR G was used to develop the image. ISOPAR evaporation and magenta toner heat fixing were identical to that used for the yellow toner. Again, 100% charge cancellation was achieved on all charged areas of the dielectric film. Also, no yellow toner was carried back into the magenta reservoir and no magenta toner was applied to any of the uncharged areas of the dielectric as well. After cooling, excellent adhesion was achieved between the yellow and magenta toners with excellent pattern definition of the magenta color on top of the previously yellow toned pattern areas. The yellow image was not disturbed when passing through the roller development system during magenta toner application and development.

Two additional colors were applied in a similar manner to the film still adhered to the belt. Cyan toner 48T and black toner DPB 1 supplied by Hilord Chemical Corporation and at a 1% concentration were applied respectively to charged images on the dielectric film which now has both yellow and magenta colors well adhered to the original white PVC film. After the black toner was fixed to the white PVC film now containing the three colors plus white, the film was cooled to ambient conditions and separated from the conductive belt. The resulting image was stable, there was no shrinkage of the film during separation and the four toners could not be removed from each other nor from the original white precoated PVC dielectric by rubbing the surface. The application of each successive toner did not affect any of the previously applied toners and no pattern distortion occurred after final separation from the belt.

DESCRIPTION OF THE DRAWING AND PREFERRED EMBODIMENTS

Figures 1, 1A, 1B, 1C:
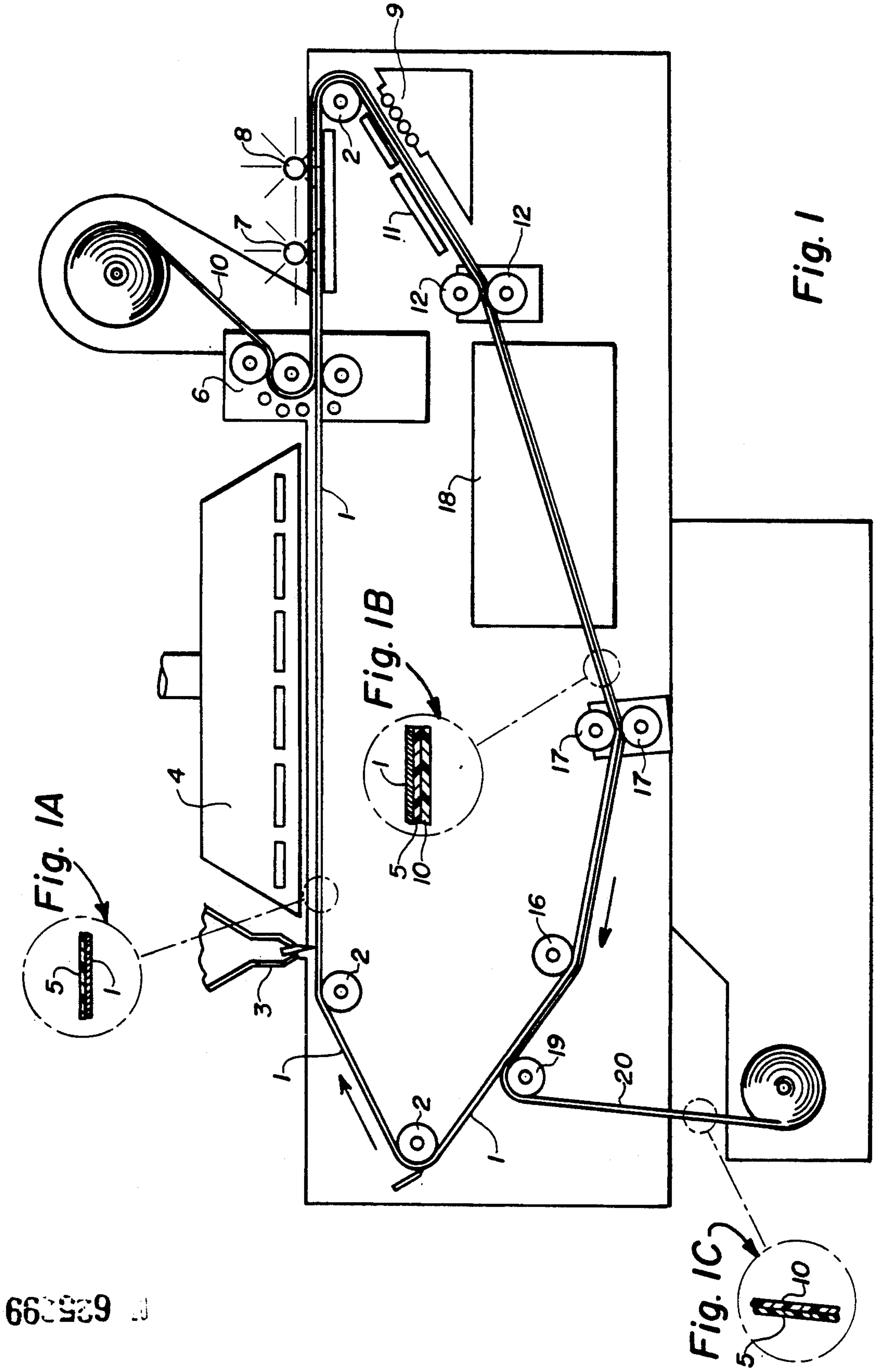
FIG. 1 is a schematic side view of the printing system of this invention.

For the sake of clarity in the drawings, several stations are disproportionately illustrated in relation to the entire system. Also, insignificant parts may not be shown.

In FIG. 1 a printing system is shown having an endless stainless steel or other conductive web or belt 1 which is driven by any suitable power means. This belt 1 is entrained about a series of primary rollers 2 and other suitable supporting and guiding structures. The belt 1 is driven through a series of electrographic stations which are generally similar to those used in conventional electrography or xerography, i.e. charge, develop and fixing stations. However, in the present process a substantially thicker dielectric material is used and can be coated on the belt 1 from solution, from a powder or liquid formulation. While we will describe the dielectric material as being coated from a solution, if suitable, the dielectric may be added as a curable dielectric formulation or as a dielectric as above defined. This coating is accomplished at deposition coating station 3. Station 3 can be any suitable dielectric dispensing means that can provide any form of a dielectric suitable for the process of this invention. After solution deposition at station 3, the belt 1 with the liquid dielectric formulation thereon is passed through an evaporation chamber 4 where the liquid or solvent of the dielectric formulation is removed, leaving a white or colorless dielectric layer 5 on belt 1. To ensure that layer 5 has a surface free of defects at least one additional thin clear or white or other colored dielectric film 10 may be provided at dielectric roll station 6. It is intended that the dielectric 5 deposited at station 3 and the dielectric film 10 supplied at station 6 now provides a final dielectric layer having a thickness of up to about 10.0 mils. Present upon belt 1 now is a two-layered dielectric material including dielectric layer 5 deposited at station 3 and dielectric film 10 deposited at film station 6. The film of dielectric 10 may have a built in adhesive material which can be activated by a heater at film station 6. As will be described below in FIGS. 2 and 3, stations 3 and 6 may be used together or separate from each other in the present system. Once surface defect-free dielectric layers 5 and 10 are deposited on belt 1, the combined dielectric layer is surface discharged by corona discharge 7 to ensure an electrically clean dielectric capable of accepting and retaining the latent image charge. When the "dielectric layer" is referred to in this FIG. 1 it is intended to include layers 5 and 10. Once the dielectric layer has been discharged by any suitable means, it is operatively passed through image station 8 which comprises an apparatus for generating charged particles in image configuration. These ions in imagewise configuration are extracted from the print head at station 8 to form the latent electrostatic image on the combined dielectric layers 5 and 10. The novel print head used in this invention is used in a nitrogen or other inert atmosphere where exothermic chemical reactions are prevented thereby substantially reducing the operating temperature of the print head. This increases the longevity of the print head and provides improved performance. Also, an air knife is used with the ion projection head which will prevent exposure of the ion projection head to toner particles and/or solvents in liquid toners by purging the space around the ion projection head with solvent-free air or other gases. The dielectric layer containing the latent image is then passed through a liquid toner at development station 9 where the latent image on it is made visible. It is preferred that the novel liquid toner used in the present invention comprises a resin of the same family as the resin used in dielectric layers 5 and 10. By using the same family of resins in both the toner and the dielectric, there is greater adhesion of the toner particle to the dielectric layer. The toned image is then passed under a heated platen 11 (as heated platen 24A in FIG. 2 and station 41 in FIG. 3) to evaporate the ISOPAR and/or other solvent from the liquid toner. ISOPAR is a registered trademark of EXXON. The dielectric layer may then be passed through heat or pressure fix nip rolls 12 where the toned image is set or fixed to the dielectric. The adhesive resin used in the toner in addition to the above purpose, helps the toned particles adhere to each other and to the dielectric layer 10. In a color system the above process is repeated with sequential color stations until the desired colored image is obtained and fixed. The resulting dielectric layer may be used as a final product or may be combined after separation station 19 with other bases in post process steps. For example, a thicker bases such as tile, wallpaper, fabric or the like may be adhered to the under surface (non-imaged surface) of dielectric layer. The resulting combined layer is passed through temperature control chamber 18 which may be heated or cooled or a combined heating-cooling chamber which with 11 evaporates the ISOPAR, fixes the toner and cools the combined structure. The dielectric layer may then be passed through pressure fix rolls 17 to further assist in fixing the toner to the dielectric. At temperature controlled separation roller 19 the final product is separated from belt 1. The final product 20, composed of layers 5 and 10 is separated from belt 1 by cooling or any other suitable means to separate it from belt 1. This generally occurs at 38° C. or less when using the materials of this invention. For those skilled in the art, other formulations can be used which will affect the separation characteristics from the belt such that release temperatures will vary depending on the materials used. Also, for those skilled in the art, it is obvious that for higher line speeds such as those greater than 30 ft/min. ISOPAR evaporation can take place over a greater length of time. The cooling chamber 18 can be modified to be both a heating and cooling chamber and in conjunction with heated platen 11 all ISOPAR can be evaporated from the surface of the dielectric substrate 10. For this case, pressure fix nip rolls 12 can be opened and pressure fix nip rolls 17 can take their place. Also, partial fixing can take place using both sets of pressure rollers or any combination of fixing steps involving 11, 12, 18 and 17. The final product 20 is separated from belt 1 by a temperature control means or any other suitable means to separate it from belt 1. For materials which are formulated to be subsequently heat reactivated types of adhesives as well as dielectrics, separation from belt 1 can be enhanced through the use of thin release coatings such as Teflon* FEP which are a permanent part of the upper surface of the conductive belt. It is understood that Teflon is a registered trademark of DuPont. These materials include non-porous vinyl materials comprising polyvinylchloride, copolymers of vinylchloride with minor portions of other materials such as vinyl acetate, vinylidene chloride and other vinyl esters such as vinylproprionate, vinylbutyrate, as well as alkyl substituted vinyl esters. Although the dielectrics based on polyvinylchloride are preferred, the invention has broad application to other polymeric materials consisting of: polyethylenes, polyacrylates (e.g. polymethylmethacrylate) copolymers of methylmethacrylate such as methyl/n-butylmethacrylate, polybutylmethacrylate, polybutylacrylate, polyurethane polyamides polyesters, polystyrene and polycarbonates. Also, copolymers of any of the foregoing or mixtures of the foregoing may be used. These materials can be used for the dielectric 5 or the dielectric film 10 and they can be the same or different. As earlier noted, the toned image can be fixed at station 12 by pressure, heat, spray, or other suitable fixing methods. In any of these fixing methods, especially in a multicolor system, the toner particle must be fixed without substantially distorting the toner particle or the diameter of the toner particle. This is important to maintain optimum color quality and resolution of the final color image.

The final product 20 removed at station 19 comprises a dielectric layer 5, and a second dielectric layer 10. The combined thickness of layers 5 and 10 is from 0.2 to about 10.0 mils.

Figures 2, 2A, 2B, 2C:
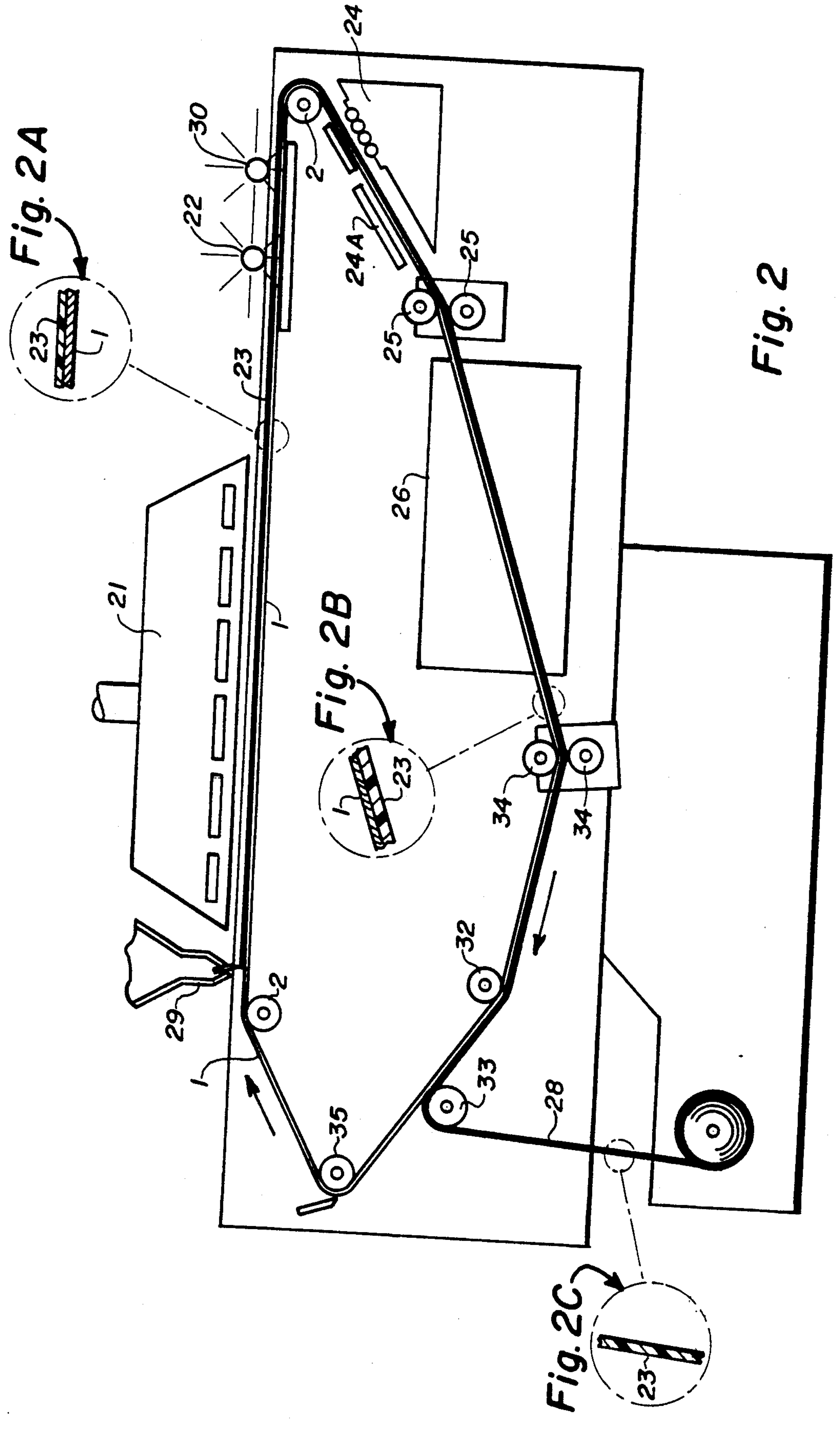
FIG. 2 is a schematic side view of a second embodiment of the printing system of this invention.

In FIG. 2 a dielectric solution or dielectric liquid formulation is coated at station 29 upon an endless conductive belt 1. The liquid formulation is controlled in such a manner that upon evaporation of the solvent or liquid therefrom a dielectric layer 23 having a final thickness of from about 0.2 to about 10.0 mils remaining on belt 1 and the surface of the dielectric layer is free of defects. The solvent or liquid is removed by passing the dielectric solution or formulation through an evaporation chamber 21. Once the 0.2 to about 10.0 mil dielectric coating is achieved, the surface is electrically discharged by the use of a discharge corona 22 or other suitable means. After being discharged the dielectric layer 23 is charged in image configuration at station 30 by the same means as described in relation to FIG. 1. As the dielectric layer 23 progresses forward bearing with it the latent image, it passes through a developer station 24 where the latent image is toned and made visible. The liquid from the toner is removed and the toned image may be fixed by any appropriate means such as pressure, heat or spray fixing at fixing means 25. Temperature control chamber 26 which may be a combined heating-cooling chamber can replace or assist the evaporation of the ISOPAR and fixing of the toner to the dielectric and assist or can replace steps 24A and 25. After it is passed through the chamber 26, the toned imaged dielectric 23 is passed through fixing rollers 34. The imaged fixed dielectric layer is passed to cooling rolls 32 and 33 and subsequently removed as the final imaged fixed product 28 at separation roll 33.

The endless belt 1 is then continuously moved to an appropriate cleaning station 35 to remove any debris and is now ready to accept another layer of dielectric at coating station 29.

Figures 3, 3A, 3B, 3C:
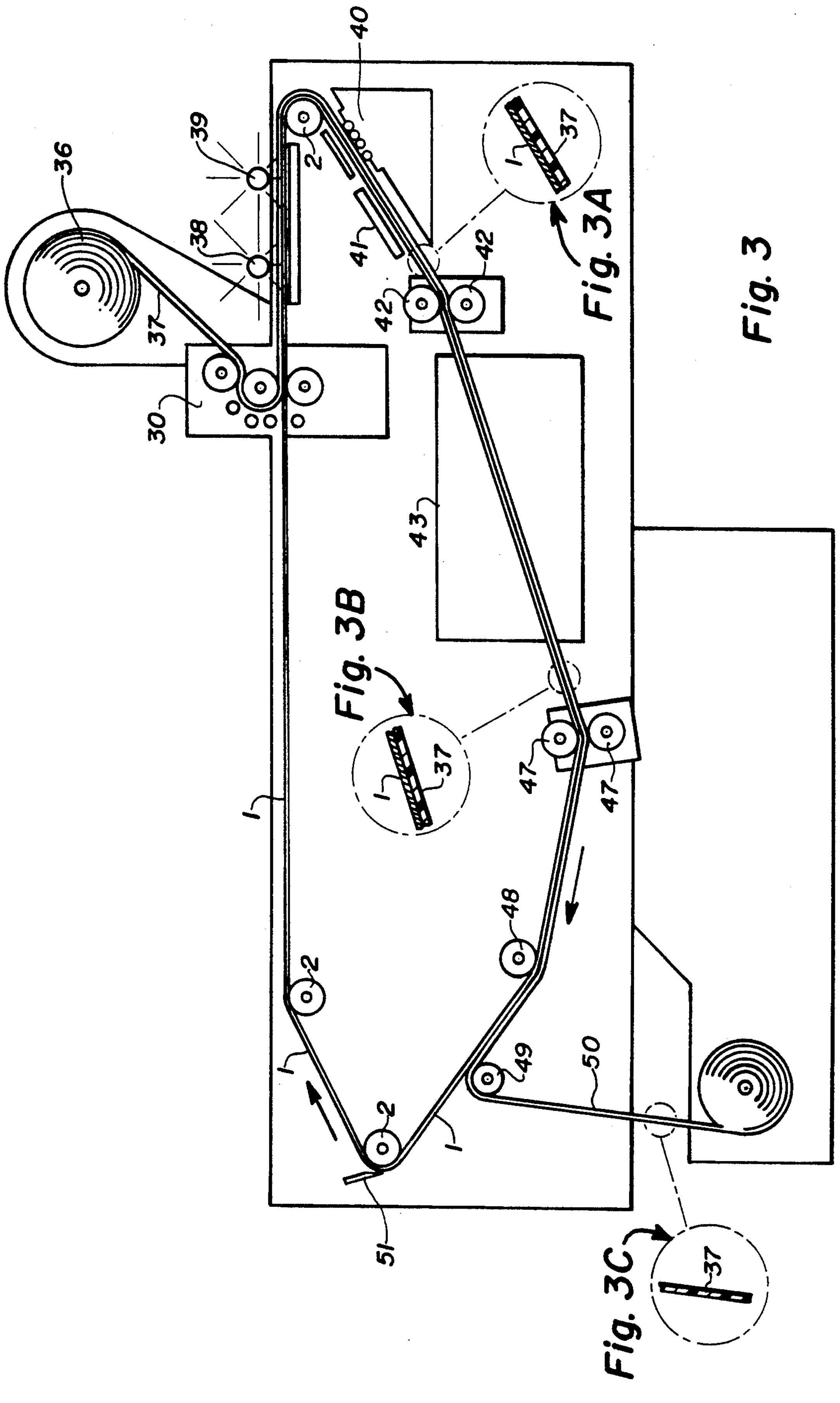
FIG. 3 is a schematic side view of another embodiment of the printing system of the present invention.

In FIG. 3 the same sequence of steps as described in FIG. 2 is followed except that rather than a dielectric solution deposited at 29 in FIG. 2 upon the endless belt 1 in FIG. 3, a spool 36 of a film dielectric material supplies the dielectric layer 37 to the surface of belt 1. This film 37 also can have a thickness of 0.2 to 10.0 mils and preferably is 0.2 to 1.5 mils. Film 37 is adhered to belt 1 by any appropriate means and the film electrically discharged at station 38. Film 37 may have an adhesive applied, if desirable. The dielectric film 37 is then image charged at station 39 (by the same method as in FIGS. 1 and 2) toned or developed at developer station 40, toner may be fixed at fixing rollers 42 or station 41. The film is then advanced and passed through stations 42, 43 and 47 in a similar manner as in FIGS. 1 and 2. The film is then advanced to cooling roller 48 and separation roller 49 where the final product 50 is removed from belt 1. The endless belt 1 then may be cleaned by cleaning blade or other means 51 and is ready for accepting another film coating of dielectric material and circulation through another "imaging cycle", i.e. imaging, developing, fixing and removal cycle.

In all of the described figures, means can be used to recycle the dielectric layer to the same print head for at least a second imaging at a point after the first image fixing. This embodiment would be used in lieu of the multistation system shown in FIG. 4. Therefore, each of the systems shown in FIGS. 1, 2 and 3 can have any conventional means to recycle the dielectric layer (after a first image fixing) through the same stations, i.e. imaging station or print head, developer station, developer or toner liquid removal station and toner fixing station.

Figures 4, 4A, 4B:
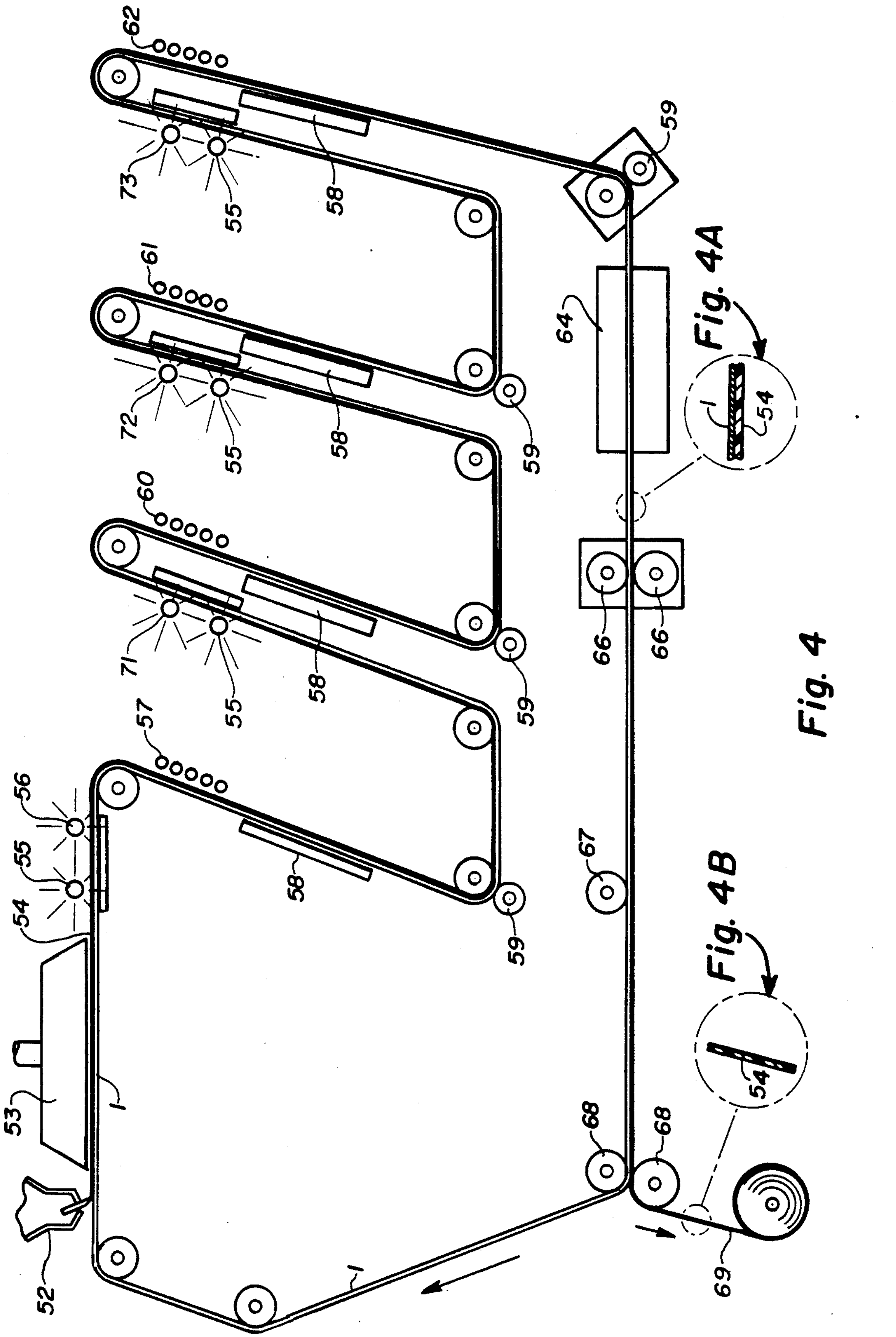
FIG. 4 is a side view of the printing system of this invention utilizing a plurality of duplicate stations.

FIG. 4 shows an imaging or printing system similar to that described in FIG. 2 except in FIG. 4 a plurality of imaging and toning or developing stations are shown. In FIG. 4 a liquid dielectric is coated upon endless belt 1 at coating station 52 and the liquid evaporated off at drying chamber 53. A final dielectric layer 54 up to about 10.0 mils now remains on belt 1. This layer 54 is then surface discharged at discharge station 55 and image charged at print head 56. The latent image formed at 56 is then passed to a first developer station 57 where a liquid toner of a first color is applied. The liquid from this toner is removed at drying means 58 and the resulting toned image fixed at fixing nips or rollers 59 or 66. Temperature control chamber 64 which may be a combined heating-cooling chamber can replace or assist the evaporation of the ISOPAR and fixing of the toner to the dielectric 54 and assist or can replace steps 58 and 59. The image may be fixed at fixing nip 59 or rollers 66. The imaged dielectric layer 54 is then passed through discharge stations 55 and print heads 71, 72 and 73 which create latent images colorwise, and developer stations 60, 61 and 62 where different colored toners are applied and each fixed at fixing rollers 59. Each toner at stations 57, 60, and 62 will selectively respond to selective latent images created by print heads 56, 71, 72 and 73 on dielectric layer 54. A cooling roller 67 removes any heat from the resulting imaged layered structure and this resulting structure passed to cool-separation rollers 68 where product 69 is removed from belt 1. Belt 1 is then cleaned and prepared for another run or cycle.

For the sake of clarity, several components of the system are disproportionately illustrated in relation to the entire system. Also, insignificant parts are not shown in order that the main components can be clearly described.

Figures 5, 5A:
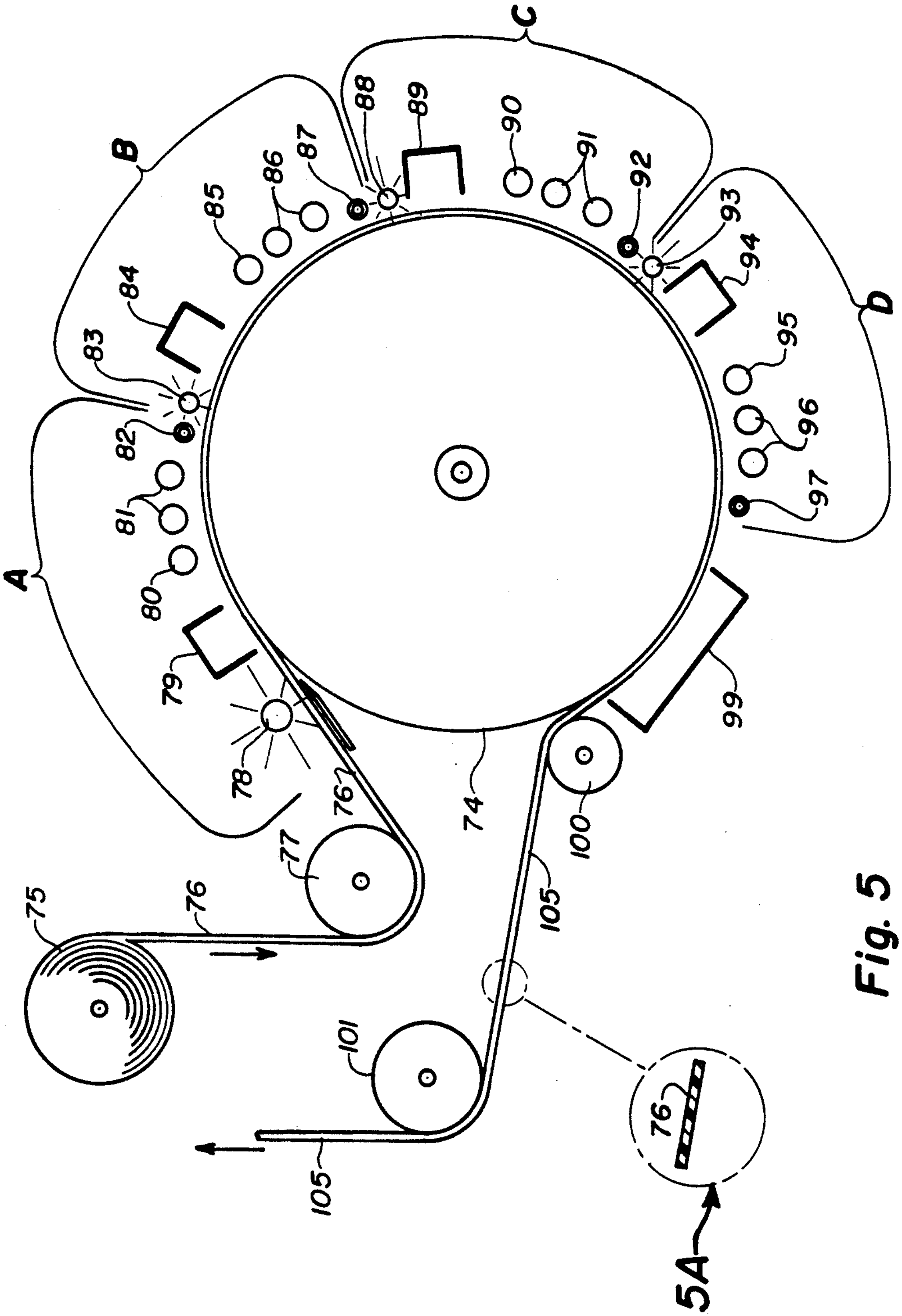
FIG. 5 is a schematic side view of the novel printing system of this invention using a drum as the conductive substrate.

In FIG. 5 an aluminum conductive substrate which in this figure is a drum 74 is provided with any suitable means of power to rotate it upon demand. As indicated throughout, conductive substrate 74 can be any convenient substrate such as a conductive drum or an endless belt moved around a drum, or a conductive substrate as earlier defined, whichever is appropriate. A source of a dielectric film 75 is located in flow relationship to drum 74 and is fed thereupon by a film dispensing means or any suitable source 75. A dielectric film 76 having a preferred thickness of about 0.5 to about 3.0 mils is fed around film entrained roller 77 and over the surface of drum 74. The dielectric film used is a white dielectric composed of poly(vinylchloride), however, any of the above-noted dielectric materials may be used if suitable or more appropriate. As the dielectric film 76 approaches unit station A it is surface discharged by a discharge means 78 to ensure an electrically clean dielectric layer 76 capable of accepting and retaining the latent electrostatic charge. A discharge means 78, 83 88 and 93 may be used in the system before each station A-D if desired. Once the dielectric layer 76 is discharged, it is operatively advanced to station A where an ion print head 79 deposits a first charge thereon in image configuration. While still at station A this latent image is contacted with a black toner material from toner reservoir 80, said toner designated BPA-06 manufactured by Research Labs of Australia, Adelaide, Australia. After the black liquid toner is attracted to the first latent image, a liquid removal or evaporation means 81 removes the liquid component from the black liquid toner and the toner is fixed upon the first latent image or first image at image fixing means 82. Station A comprises components 78, 79, 80, 81 and 82. Conventional fixing methods such as pressure fixing, spray fixing, heat fixing, combinations of these or any other suitable fixing means may be used at fixing means 82. Once the first image has been fixed, the dielectric film 76 is advanced to unit station B where a second print head 84 deposits a second latent electrostatic image upon dielectric layer 76. This second latent electrostatic image on the dielectric layer 76 is then advanced to a second toner reservoir 85 containing a cyan liquid toner. This second toner is made up of a toner identified as CPA-04 manufactured by Research Labs of Australia, Adelaide, Australia. After the cyan liquid toner contacts the latent image and the toner particles therein are attracted to the second latent image, the liquid component of the cyan liquid toner is removed at liquid removal means 86 and the remaining toner fixed upon the second latent (or now toner or developed) image by fixing means 87. Station, B, comprises elements or components 83, 84, 85, 86 and 87 and all subsequent stations will be made up of similar components. At unit station C the first and second imaged dielectric layer 76 is image charged by a third ion projection head 89 to provide a third latent electrostatic image. This third image is advanced to a third liquid developer or toner reservoir 90 made up of a magenta color toner. This toner is designated MPA-02 manufactured by Research Labs of Australia, Adelaide, Australia. After the magenta toner is attracted to the third latent image, the liquid portion of the toner is removed at evaporation or liquid removal means 91 and the remaining magenta toner fixed in place at fixing means 92. The imaged dielectric layer 76 is then advanced to unit station D where a fourth latent electrostatic image is deposited thereon by ion projection cartridge or head 94. As in previous stations, the imagewise information is electrically communicated to each print head which then responds with the corresponding image deposition of ions upon the dielectric layer 76. This fourth latent image is moved to a fourth liquid toner reservoir 95 where a yellow toner identified as VPA-03 manufactured by Research Labs of Australia, Adelaide, Australia is deposited in fourth imagewise configuration upon the dielectric layer 76. The liquid developer is then dried at liquid removal means 96 and the fourth image fixed at fixing means 97. The resulting imaged film layers 76 may then be advanced as product layer 105, dried at drying station 99 and removed from the system at separation station 100.

Any number of unit stations greater than one may be used in the process and apparatus of this invention. An important feature is to provide a system for color imaging where the registration is simple and effective. This can be done in the present system with two or more images. An additional step subsequent to air drying at drying station 99 may be used in the present system; that is, where a thicker substrate is attached to the underside (non-imaged) face of product layer 105. This substrate may be a base layer used for example in tiles, wallpaper, ceiling products or floor products and the like. This step is not shown in the drawing since it and many other post-process steps may be used to combine product layer 105 with a multitude of other materials or objects. For ease of handling, the dielectric film used in this invention is preferably about 0.5 to about 3.0 mils thick, however, any desirable or suitable thickness may be used. If desirable, a post-system lamination step can be done if a laminated product layer 105 is desired.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A non-impact printer comprising in combination a dielectric dispensing means, a conductive substrate, at least one print head, at least one developer station, at least one toner fixing station, and a separation station, providing in combination thereby a printing system, said dielectric dispensing means having means to provide a dielectric upon said conductive substrate at a point in said system prior to said print head, and said separation station having means subsequent to said toner fixing station to separate said dielectric from said conductive substrate.

2. The printer of claim 1 wherein said system is a monochromatic system.

3. The printer of claim 1 wherein said system is a multicolor system.

4. The printer of claim 1 wherein said dielectric dispensing means has means to supply said dielectric at a thickness of at least 0.2 mils.

5. The printer of claim 1 wherein said dielectric dispensing means has means to supply said dielectric at a thickness of about 0.2 mils to about 10.0 mils.

6. The printer of claim 1 wherein said dielectric dispensing means has means to deposit a dielectric upon said conductive substrate in a liquid formulation, said printer having means to render the liquid formulation to a condition to form a dielectric capable of receiving and holding a latent electrostatic image.

7. The printer of claim 1 wherein said dielectric is supplied to the conductive substrate by a film dispensing means.

8. The printer of claim 1 wherein said system includes at least one means for fixing images subsequent to each image developing station.

9. The printer of claim 1 wherein said system has means to provide at least one additional imaging cycle subsequent to separation of said dielectric from said conductive substrate.

10. The printer of claim 1 having means in said system subsequent to said toner fixing station to attach a base or support to an unimaged surface of said dielectric.

11. The printer of claim 1 having film dispensing means to supply said dielectric to the surface of said conductive substrate at a point in said system prior to said print head.

12. A non-impact printer comprising a conductive substrate, at least one dielectric on said conductive substrate, at least one print head for imagewise charging said dielectric, at least one image developer station, at least one developer liquid removal station, at least one toner fixing station, and a separation station to provide in combination a printing system, means to deposit at least one first dielectric upon said conductive substrate, said dielectric having a substantially continuous surface capable of receiving and retaining an electrostatic latent image, said conductive substrate having means to advance it through each of the stations, means to recycle said dielectric to a print head for at least a second imagewise charging, and means for continuously advancing beyond a last separation station, means at said separation station for removing substantially all of said first dielectric from said conductive substrate, means to advance said conductive substrate beyond said separation station to means capable of depositing at least a second dielectric upon said conductive substrate and means to forward said second dielectric to said print head and continuously through subsequent stations.

13. The printer of claim 12 having a plurality of toner developer stations.

14. The printer of claim 12 having a plurality of print heads positioned prior to said developer stations.

15. The printer of claim 12 having means for applying an adhesive to said dielectric prior to a toner fixing station and subsequent to imaging of said dielectric.

16. The printer of claim 12 having means for providing a base or support for said dielectric, said means being positioned in said system subsequent to said separation station.

17. The printer of claim 12 wherein said system comprises sequentially at least one of each of the following: a first dielectric dispensing station, a dielectric discharging station, a print head imaging station, an image developing station, a liquid evaporation station, an image fixing station, an adhesive applying station, a substrate dispensing station, and a separation station, said printer having means for repeating advancements of said conductive substrate through multiple passes of said stations.

18. The printer of claim 12 wherein all of said dielectrics have a thickness of at least 0.2 mils.

19. The printer of claim 12 wherein all of said dielectrics have a thickness of from about 0.2 mils to about 10.0 mils.

20. The printer of claim 12 wherein all of said dielectrics are deposited upon said conductive substrate in a liquid formulation and having means to subsequently render the liquid portion therefrom to form a dielectric capable of receiving and holding a latent electrostatic image.

21. An electrographic process which comprises in at least one sequence the following steps: supplying a dielectric to the surface of a conductive substrate, electrically discharging at least one surface of said dielectric, providing an imagewise charge upon the previously discharged surface of said dielectric, subsequently passing said dielectric through a developer station and a developer-liquid removal station wherein said imagewise charge is made into a visible image, fixing said visible image to the surface of said dielectric to form an imaged dielectric, removing said imaged dielectric from said conductive substrate, cleaning said conductive substrate and repeating said steps continuously to obtain a desired product.

22. The process of claim 21 wherein said dielectric is supplied to the surface of said conductive substrate by a dielectric film dispensing means.

23. The process of claim 21 wherein said dielectric is sequentially imaged, developed and fixed in a plurality of passes prior to said separation.

24. The process of claim 21 wherein after said conductive substrate is cleaned said dielectric is again sequentially imaged, developed and fixed in a plurality of passes prior to separation from said conductive substrate.

25. The process of claim 21 wherein at a base support station a thicker base is provided on a surface of said dielectric opposite to the imaged surface, said base support station provided before removing said imaged dielectric from said conductive substrate.

26. The process of claim 21 wherein a 0.2 mil to 10.0 mil thick layer of dielectric material is supplied to the surface of said conductive substrate.

27. The process of claim 21 wherein said dielectric is continuously supplied to said conductive substrate subsequent to said cleaning.

28. The process of claim 21 wherein said dielectric is supplied to the surface of a conductive substrate in a liquid formulation, said process including means to render the liquid formulation to a condition to form thereby a dielectric capable of receiving and holding a latent electrostatic image.

* * * * *